UNITED STATES PATENT OFFICE.

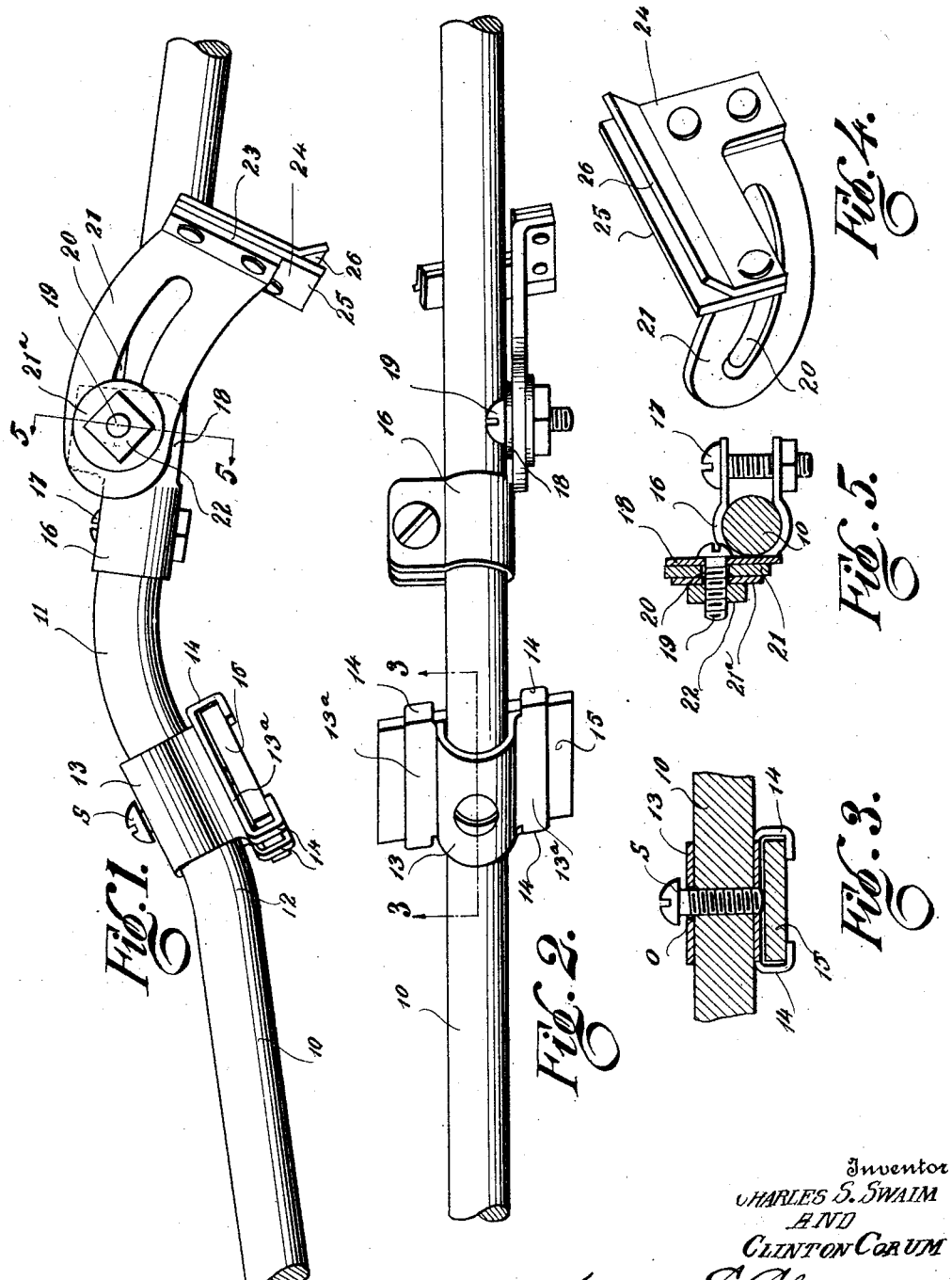

CHARLES S. SWAIM AND CLINTON CORUM, OF LONG BEACH, CALIFORNIA.

LAWN-MOWER SHARPENER.

1,405,561.  Specification of Letters Patent.  Patented Feb. 7, 1922.

Application filed September 15, 1920. Serial No. 410,531.

*To all whom it may concern:*

Be it known that we, CHARLES S. SWAIM and CLINTON CORUM, citizens of the United States, residing at Long Beach, in the county of Los Angeles and State of California, have invented certain new and useful Improvements in Lawn-Mower Sharpeners, of which the following is a specification, reference being had to the accompanying drawings.

This invention relates to sharpening devices for the blades of lawn mowers.

An important object of the invention is to provide a device of this character which may be readily adjusted for sharpening the blades of lawn mowers of different sizes.

A further object of the invention is to provide a device of this character embodying an abrasive medium adapted to contact one blade of the cutting drum of a lawn mower and a guiding medium adapted to engage a second blade of the lawn mower thereby assuring proper relative positioning of the abrasive medium and the blade being sharpened.

A further object of the invention is to provide a device of the described character wherein the guiding medium engages the blade with which it coacts adjacent the cutting edge thereof, the guiding medium being so constructed that no actual contact is made with the cutting edge thereby, preventing dulling thereof.

A still further object of the invention is to provide a device of this character which when shifted longitudinally of the cutting drum automatically rotates the drum through the guiding medium to cause a spiral blade to assume the same relative position with respect to the axis of the drum throughout its length, thereby enabling sharpening of the blades of the lawn mower by a straight line reciprocatory motion of the blade sharpener.

Other objects and advantages of the invention will become apparent throughout the course of the following description.

In the accompanying drawings, wherein for the purpose of illustration, is shown a preferred embodiment of our invention, and wherein like reference characters designate like parts throughout:

Fig. 1 is a side elevation of a lawn mower sharpener constructed according to our invention.

Fig. 2 is a plan view thereof.

Fig. 3 is a section taken on the line 3—3 of Figure 2.

Fig. 4 is a perspective of the guide member detached.

Fig. 5 is a section on the line 5—5 of Figure 1, and

Figure 6:
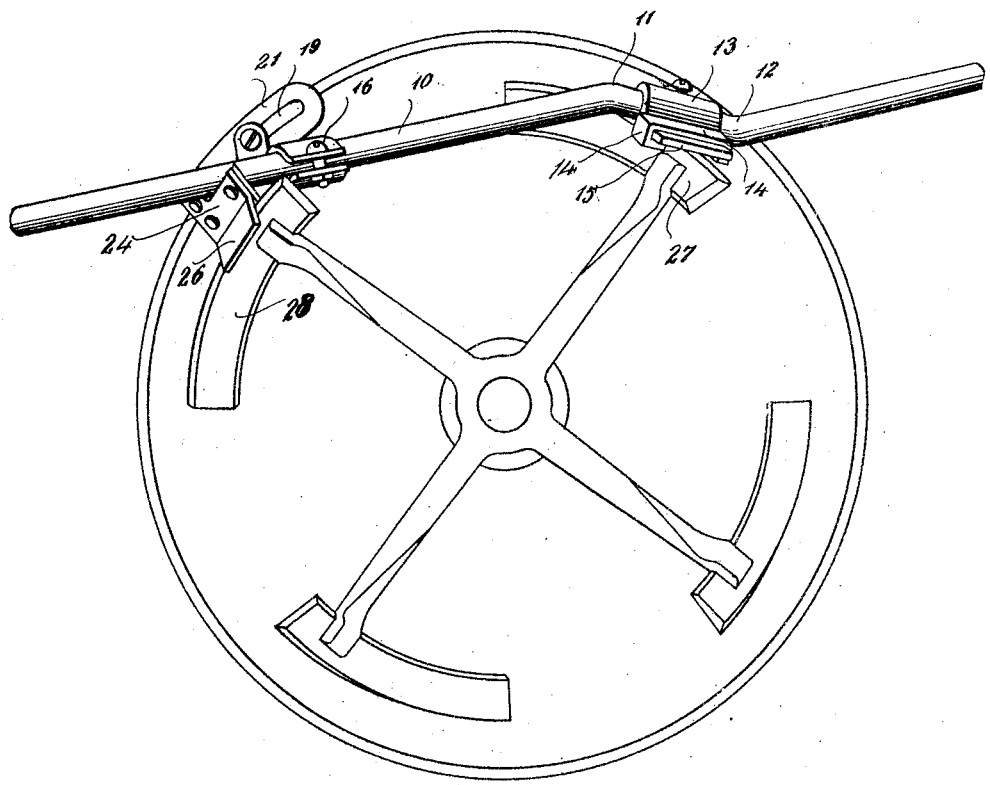
Fig. 6 is a side elevation showing our device in position upon the drum of a lawn mower for sharpening the blades thereof.

Referring now more particularly to the drawings, the numeral 10 indicates a bar provided approximately centrally thereof with a bend 11 and adjacent such bend with a reverse bend 12 of less magnitude than the bend 11, whereby the bar is provided with ends at a slight angle with one another and a central portion at an angle to each of said ends.

Mounted upon such central portion is a yoke 13 substantially U-shaped and embodying at the ends of its arms outstanding portions 13ª provided with downwardly extending guides 14 adapted to receive therebetween a section of an abrasive medium 15. A screw S extends through an opening O formed in the yoke 13 and has threaded engagement with the bar 10 through which extends and engages with its lower end as at E the abrasive medium 15. It will be seen that by adjusting the screw S the abrasive medium may be loosened or tightened within the abrasive guides 14.

Secured to the end of the bar remote from the bend 11 with respect to the yoke 13 is an adjustable yoke 16 consisting of a strap extending about the bar and secured thereto in adjusted position by tightening the strap through the medium of an adjusting bolt 17. The adjustable yoke 16 has extending upwardly therefrom an ear 18 through which extends a bolt 19, this bolt likewise extending through an arcuate slot 20 formed in an arcuate arm 21. The bolt is provided with a washer 21ª and clamping nut 22. It will be seen that the arcuate arm 21 may be rotated with respect to the bolt 19 and may be likewise longitudinally adjusted throughout action of the slot 20 with the bolt 19 and may be secured in such adjusted position.

The arcuate arm 21 is provided upon its lower end with a transversely disposed angular foot 23, to which is secured a guiding member 24, having the face adjacent the abrasive element 15 bifurcated to form arms 25 and 26. An inspection of the drawing will reveal the fact that the abrasive element 15 and the guide 24 are substantially parallel and are angularly disposed with relation to the bar 10. This angle is provided to compensate for the angularity of the spiral blades of the cutting drum of the lawn mower.

In the operation of our device the abrasive element 15 is properly positioned upon one of the blades 27 of the cutting drum so that it flatly engages the ground face thereof. The arm 21 is then properly adjusted so that the arm 26 of the guide 24 engages the forward face of the next adjacent blade 28 of the cutting drum and the arm 25 engages the ground surface. It will be noted that the arms 25 and 26 are so formed that when they are in such engaged position the cutting edge proper of the blade is not in contact with any part thereof, thereby preventing the dulling of such cutting edge. When the arm 21 has been so adjusted it is merely necessary to reciprocate the bar longitudinally of the cutting drum of the lawn mower, the engagement of the guide 24 with the blade 28 substantially rotating the drum to properly position the blade 27 for engagement with the abrasive element 15. This abrasive element may be constructed of any desired material, preferably of metal, as a file, or of carborundum.

It will be obvious that our device, by reason of its simplicity and efficiency in operation is particularly well adapted for the use for which it is intended, and it will likewise be obvious that the construction thereof is susceptible to some change without in any manner departing from the spirit of our invention. We accordingly do not limit ourselves to such construction except as so limited by the subjoined claims.

Having now described our invention, what we claim is:

1. In a lawn mower sharpener, a supporting member, an abrasive element carried by said member and adapted to engage one blade of the cutting drum of the lawn mower, and a guide carried by said supporting member and adapted to engage a second blade of the cutting drum.

2. In a lawn mower sharpener, a bar, a yoke mounted upon the bar and including guides, an abrasive element mounted within the guides, identical means for securing said abrasive element within the guides and securing said yoke upon the bar, said abrasive element being adapted to engage one blade of the cutting drum of the lawn mower and a guide carried by said bar and adapted to engage a second blade of the cutting drum.

3. In a lawn mower sharpener, a bar, a yoke mounted upon the bar and including guides, an abrasive element mounted within the guides, identical means for securing said abrasive element within the guides and securing said yoke upon the bar, said abrasive element being adapted to engage one blade of the cutting drum of the lawn mower and a guide carried by said bar and adapted to engage a second blade of the cutting drum, said guide being longitudinally adjustable upon said bar.

4. In a device of the type described a bar, an abrasive element carried by the bar intermediate the ends thereof, a yoke adjustably mounted upon the bar, an arcuate arm carried by said yoke and rotatably and longitudinally adjustable thereon and a guide carried by said arcuate arm, said abrasive element being adapted to engage one blade of the cutting drum of a lawn mower and said guide being adapted to engage the next adjacent blade of the cutting drum.

5. In a device of the type described a bar, an abrasive element carried by the bar intermediate the ends thereof, a yoke adjustably mounted upon the bar, an arcuate arm carried by said yoke and rotatably and longitudinally adjustable thereon and a guide carried by said arcuate arm, said abrasive element being adapted to engage one blade of the cutting drum of a lawn mower and said guide being adapted to engage the next adjacent blade of the cutting drum, said guide embodying spaced arms adapted to receive therebetween the cutting edge of the blade engaged thereby, the ends of said arm engaging the adjacent faces of the blade.

In testimony whereof we hereunto affix our signatures.

CHARLES S. SWAIM.
CLINTON CORUM.